B. L. JONES.
MUD GUARD.
APPLICATION FILED FEB. 3, 1908.
923,849.
Patented June 8, 1909.
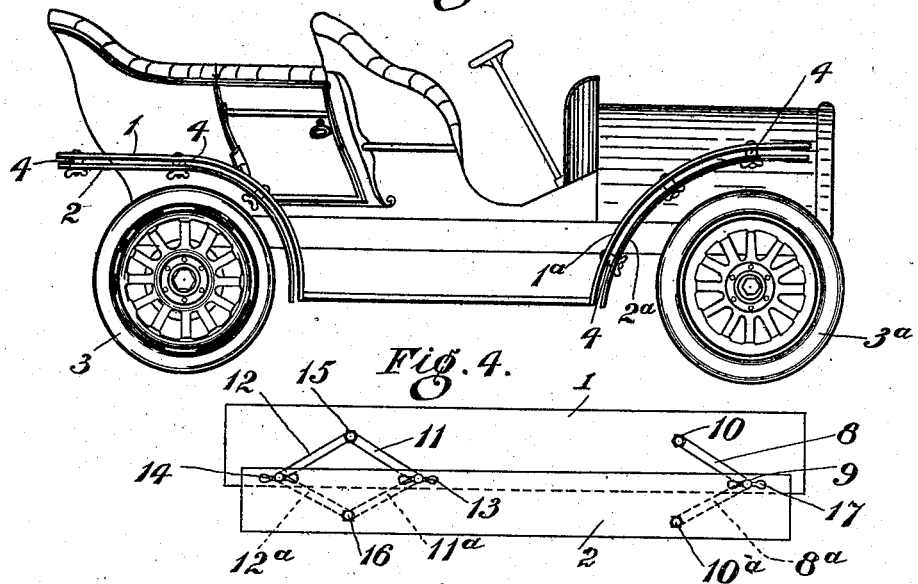
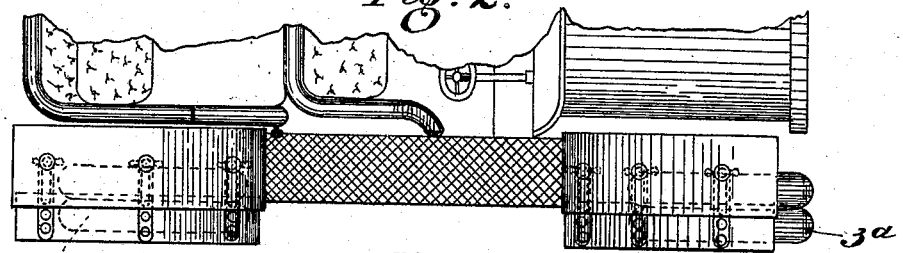
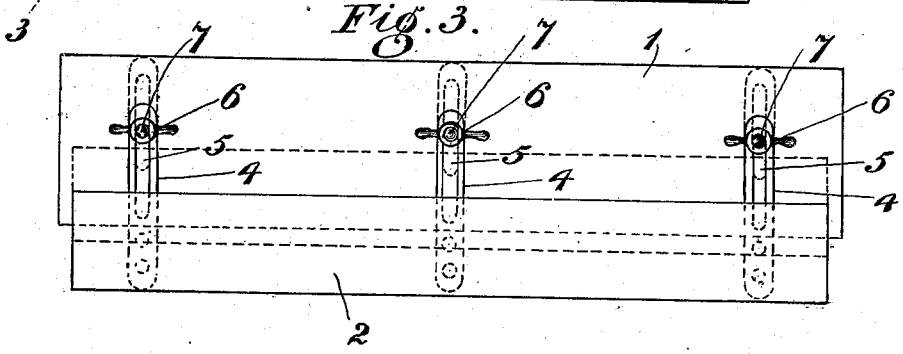
Witnesses
Arthur Woodman
W. H. Leivers
Inventor
Bryan Lanchester Jones
per
John P. O'Donnell
Attorney

UNITED STATES PATENT OFFICE.

BRYAN LANCHESTER JONES, OF HIGHBURY, LONDON, ENGLAND.

MUD-GUARD.

No. 923,849.      Specification of Letters Patent.      Patented June 8, 1909.

Application filed February 3, 1908. Serial No. 414,071.

*To all whom it may concern:*

Be it known that I, BRYAN LANCHESTER JONES, a subject of the King of Great Britain and Ireland, residing at Highbury, in the county of London, England, (whose post-office address is 28 Highbury Grove, Highbury, in the county of London, England,) have invented certain new and useful Improvements in Mud-Guards; and I do hereby declare the following to be a full, clear, and exact description of the invention, such as will enable others skilled in the art to which it appertains to make and use the same.

This invention has for its object improvements in mud guards for motor cars and other road vehicles.

The invention comprises features or details of construction hereinafter described and claimed.

The accompanying drawing illustrates the invention:—

Figure 1 is a side elevation of a motor car illustrating an application of the invention. Fig. 2 is a part plan view showing the adjustable or movable mud guards in position over the additional or emergency wheels. Fig. 3 is a diagrammatic outlay showing an underneath view of a mud guard constructed in accordance with this invention. Fig. 4 is a similar view to Fig. 3 but showing alternative arrangements.

Like reference numbers indicate corresponding parts in the several figures of the drawing.

1, 1$^a$ are the fixed or permanent mud guards and 2, 2$^a$ are the adjustable or movable mud guards. The adjustable or movable mud guards may be arranged either above or below the permanent mud guards.

3, 3$^a$ indicate the additional or emergency wheels, which may be the well known Stepney wheels, which are secured to the permanent wheels of the car, in the known manner, in the case, for instance, of a burst tire.

Referring to Fig. 3, the adjustable or movable mud guard 2 has fixed to it, by means of rivets or otherwise, two or more (for instance as shown in Fig. 3) slotted bars 4, the length of the slots 5 in the said bars determining the amount of movement of the mud guard 2. The adjustable mud guards 2, 2$^a$ are, in the example shown, supported by the permanent or fixed mud guards 1, 1$^a$ and are held in their inner or outer (inoperative and operative) positions by means of wing nuts 6 or their equivalents screwed up on the threaded ends of bolts or pins 7 riveted or otherwise fixed in the permanent mud guards 1 and 1$^a$. The inner position of the movable or adjustable mud guard 2, *i. e.* the position when the additional or emergency wheel is not in use, is shown by dotted lines in Fig. 3.

While the foregoing describes what I consider is the preferable construction and method of mounting the adjustable or movable mud guard, yet if desired the arrangement illustrated in Fig. 4 might be employed. In this figure I have shown two alternative arrangements of pivoted or folding links by means of which the movable or adjustable mud guard is mounted on or supported by the permanent mud guard. At the right hand end of the figure the links 8, 8$^a$ are pivotally connected together at 9 the other ends of these links being connected respectively to pivots 10, 10$^a$ respectively secured to the fixed and movable mud guards. At the left hand end of the figure instead of only one pair of pivoted links there are two pairs of links, 11, 11$^a$ and 12, 12$^a$, pivoted together respectively at 13 and 14, the other ends of each of these pairs of links being pivotally connected respectively with the fixed mud guard 1 at 15 and with the movable or adjustable mud guard 2 at 16. A wing nut or its equivalent 17 may be provided on one or more of the pivots or joint pins of the links (the ends of the pivots being suitably threaded) so that by tightening up the wing nut the links and the movable mud guard will be held in the desired position. As shown at the right hand end of Fig. 4 a wing nut 17 is provided on the pivot 9, while at the left hand end of the figure a similar wing nut is provided on each of the pivots 13 and 14.

I do not limit myself to the exact details of construction or arrangement of parts hereinbefore described and illustrated. For instance instead of the movable or adjustable mud guard being supported by the fixed or permanent mud guard it might obviously be supported directly by or from the body of the car on brackets or extensions thereon.

What I claim as my invention and desire to secure by Letters Patent is:—

1. A mud-guard formed of two superposed plates curved in the direction of their length and arranged substantially parallel to each other, one of the said plates being movable laterally of the other to vary the width of the mud-guard, and fastening devices for connecting the said plates together.

2. The combination, with a vehicle body, and a road wheel; of a guard-plate secured to the side of the vehicle body and projecting over the said road-wheel, an adjustable guard-plate movable laterally of the aforesaid guard-plate and arranged substantially parallel to it, and fastening devices for securing the adjustable guard-plate in position.

3. The combination, with a fixed mud guard, of an adjustable mud guard, slotted bars fixed on the adjustable mud guard, bolts or their equivalent secured in the fixed mud guard with which bolts the said slotted bars engage, and nuts on the said bolts for holding the adjustable mud guard in the desired position.

In testimony whereof I affix my signature, in presence of two witnesses.

BRYAN LANCHESTER JONES.

Witnesses:
 W. H. LEWERS,
 G. R. SMITH.